Patented Aug. 7, 1945

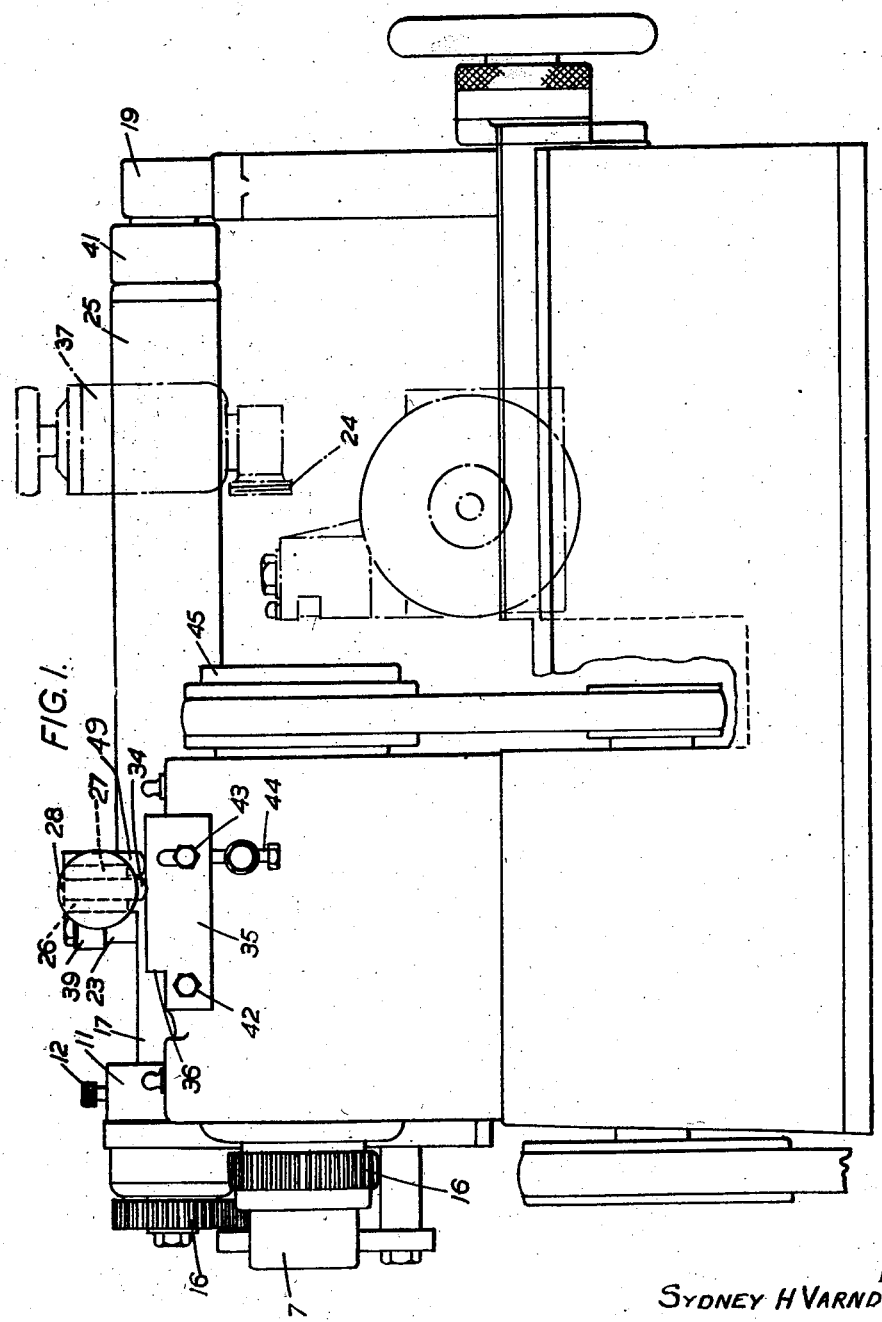

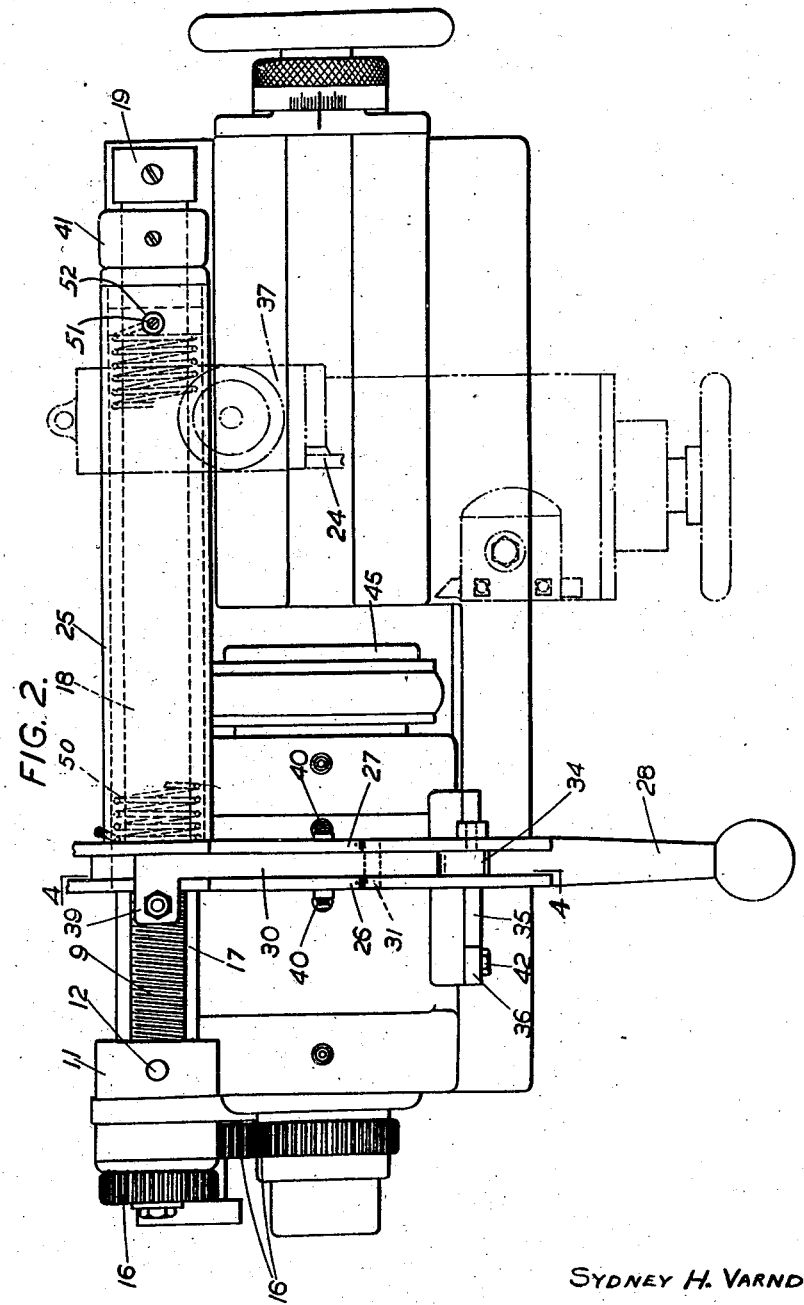

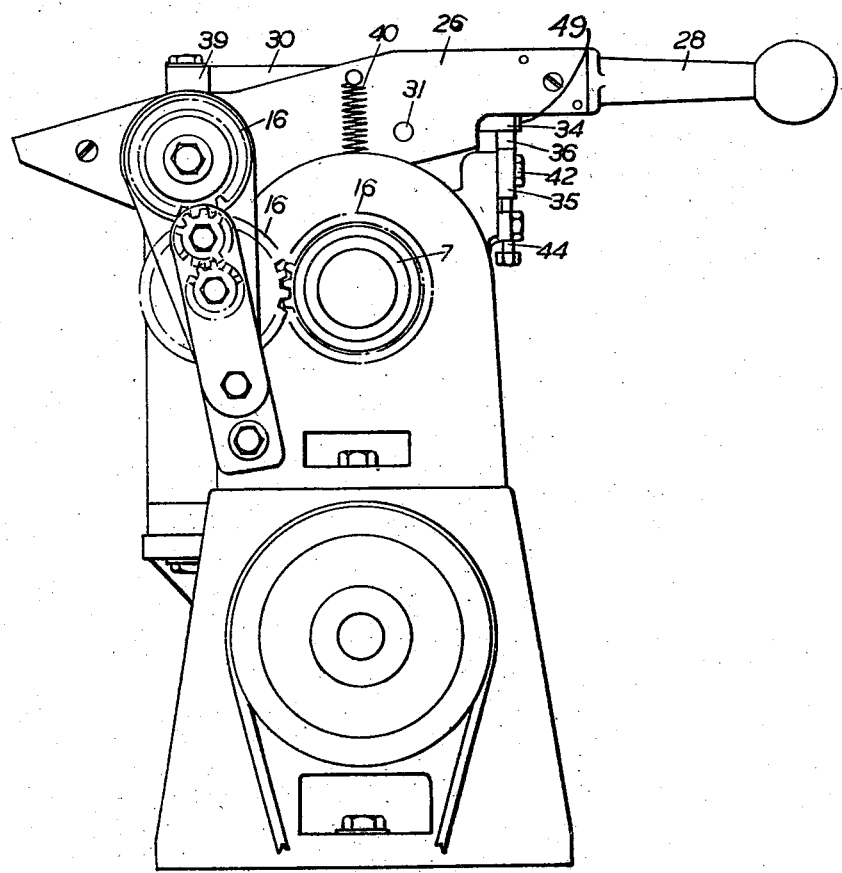

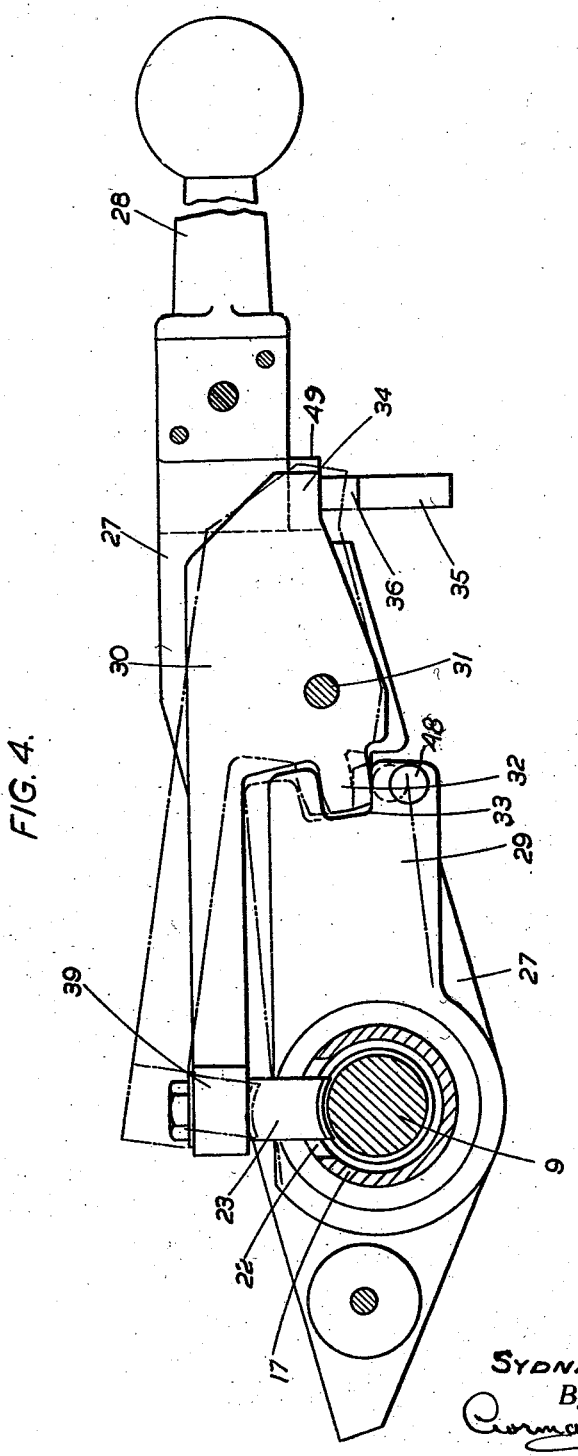

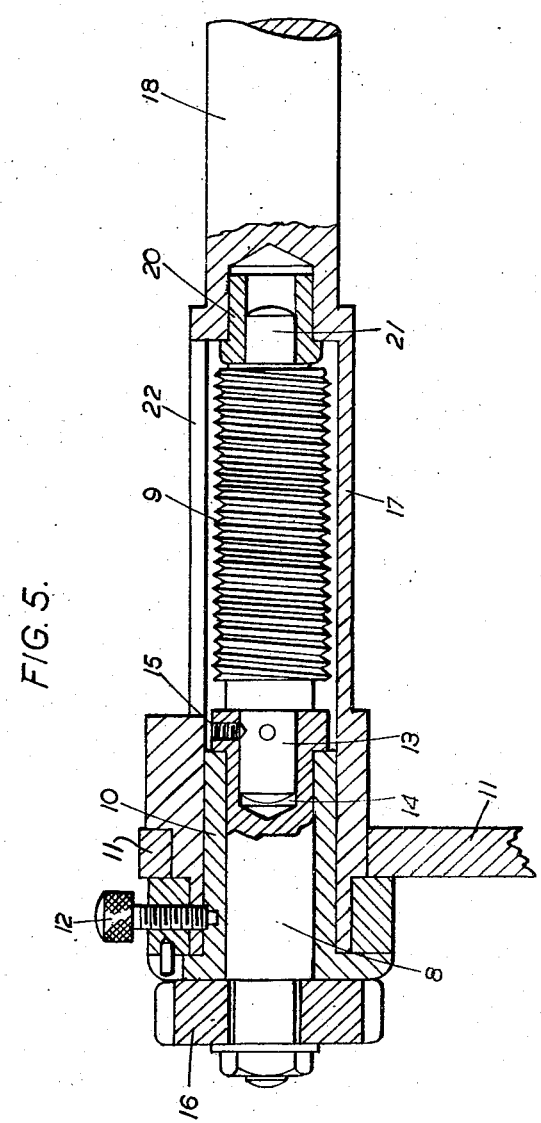

2,381,849

UNITED STATES PATENT OFFICE 2,381,849

SCREW-CUTTING LATHE

Sydney Herbert Varndell, London, England

Application October 28, 1943, Serial No. 507,933
In Great Britain October 30, 1942

3 Claims. (Cl. 82—5)

This invention comprises improvements connected with screw-cutting lathes of the type which are adapted for chasing threads, the master thread being on a former on the lathe.

The object of the present invention is to provide an improved arrangement whereby the travel of the segmental nut part or the like along the thread on the former together with the thread cutting tool is automatically stopped at a predetermined position, thereby eliminating the risk of the tool over running the requisite stop.

A further object of this invention is to provide an improved arrangement for the mounting of the segmental nut or the like which is adapted to engage the screwed former, the screw-cutting tool and the operating handle for controlling the beforementioned parts.

Referring to the drawings—

Figure 1 is a front elevation of a screw-cutting lathe, according to this invention.

Figure 2 is a plan.

Figure 3 is an end elevation.

Figure 4 is a section at 4—4 in Figure 2, of the operating lever, whilst,

Figure 5 is a detail section of the arrangement for mounting the screwed former.

In carrying the present invention into practice, as shown upon the accompanying drawings, at the rear of the lathe spindle 7 is mounted a spindle 8 to which a screwed former 9 is connected, said spindle is carried by a bush 10 mounted in the lathe frame 11. This bush 10 being held in the frame 11 by the fixing screw 12.

The screwed former 9 has formed on same an extension 13 which is positioned in a recess 14 in the spindle 8 and is secured to same by a locking screw 15.

To remove the screwed former 9 to change same, the locking screw 12 holding the bush 10 in position in the lathe frame 11 is unloosened to permit of the bush 10 being withdraw together with the spindle 8 and the screwed former 9 with it, whilst by unloosening the locking screw 15 in the spindle 8 which secures the screwed former 9 to said spindle 8, the screwed former 9 can be removed and changed.

The screwed former 9 is driven by a train of gears 16 off the lathe spindle 7, so that the speed of the screwed former 9 is half that of the lathe spindle 7.

Positioned over the screwed former 9 is a tubular part 17 which forms part of the member 18. The tubular part 17 of the member 18 is mounted in the frame 11 of the lathe, whilst the opposite end of the member 18 is secured in the bracket 19, which is secured to the bed of the lathe.

Mounted within the tubular part 17 of the member 18 is a bearing 20 in which is mounted the spigot 21 on the end of the screwed former 9.

The top of the tubular part 17 in alignment with the screwed former 9 has a slot 22 cut therein to accommodate the segmental portion of a nut 23, which controls the travel of the thread cutting tool 24.

Mounted over the beforementioned member 18 is a tubular part 25, which at each end is mounted on distance-pieces, which are slidably mounted on the member 18, whilst in the space between the member 18 and the tubular part 25 is disposed a tension spring 50, the one end of which is connected to the member 18 by inserting the bent over end of the spring 50 in a hole in the member 18 and securing same in position by means of the screw 51. A hole 52 is cut in the tubular part 25 to obtain access to the screw 51. The opposite end of the spring 50 is secured to the tubular part 25 by being passed through a hole in said tubular part 25 and then bent over onto same.

Rotatably mounted on the tubular part 25 is an arm which consists essentially of the two side members 26, 27 held apart by distance pieces, whilst mounted in the end of said members 26, 27 in a handle 28.

Mounted between the beforementioned side members 26, 27 of the arm are two interconnected members 29, 30. The first of these members, 29 is secured to the beforementioned tubular part 25, whilst the second of said members, 30 is pivotally mounted at 31 in the side members 26, 27 and has a toothed part 32 on its inner end which is adapted to engage a complementary part 33 in the member 29 secured to the tubular part 25.

The outer end 34 of said pivoted member 30 is adapted to engage the adjustable bar 35 which is secured to the front of the lathe head, which bar 35, can be adjusted to the required depth of the thread to be cut and also to the taper if a tapered part is to be threaded, by means of the adjusting screws 42, 43 and 44. In this bar 35 is provided a gap 36, so that on the arm advancing along the bar 35 and the pivoted member 30 mounted in the arm reaching the gap 36, it will automatically fall into said gap 36 for the purpose hereinafter explained.

Connected to the beforementioned tubular part 25 is the tool arm 37 in which is adjustably mounted the thread cutting tool 24, whilst attached to the interconnected member 30 disposed between the side members 26, 27 of the arm, which is connected to the tubular part 25, in an arm 39 to which is attached the segmental nut part 23 which is adapted to engage the screwed former 9.

In operation, the pivoted arm carrying the segmental nut part 23 and the thread cutting tool 24 are normally turned up so that they are disposed substantially vertically at the back of the lathe. When it is desired to chase a thread, the pivoted arm is brought down by means of the handle 28 until the outer end 34 of the pivotally mounted member 30 disposed in the arm, is brought into engagement with the adjustable bar 35 mounted on the front of the lathe head. This downward pressure is maintained by the operator on the handle 28 during the thread cutting operation. The downward pressure exerted on the handle 28, is such that the hardened stop member 49, secured to the end of the member 27 of the pivoted arm is brought into contact with the adjustable bar 35 along which the pivoted arm 26, 27 travels during the thread cutting operation. The pivotally mounted member 30, will cause the interconnected member 29 in said arm, to swing and partially rotate with it the tubular part 25, to which is connected the tool arm 37 and bring the thread cutting tool 24 into position for cutting a thread. Simultaneously with this movement, the segmental portion of the nut 23 which is adapted to engage the threaded former 9 and which is connected to the arm 39 of the member 30 pivotally mounted at 31, is moved into engagement with the threaded former 9.

The thread cutting tool 24 will now travel along together with the arm in which the handle 28 is mounted until the gap 36 is reached in the bar 35 positioned on the front of the lathe head, which is engaged by the end 34 of the pivoted interconnected part 30 in the arm. When this gap 36 is reached the pivoted member 30 under the action of the springs 40 connected to the pin 48 mounted in the member 29 and to the members 26, 27, automatically falls and causes the segmental nut part 23 to disengage the threaded former 9 and the thread cutting tool 24 to be raised to disengage the work in the lathe chuck 45, thus automatically stopping the travel of the pivoted arm, which is retained on the bar 35 and does not fall at the gap 36, only the end 34 of the pivoted member 30 entering the gap 36 as at this moment the segmental nut part 23 disengages the screwed former 9 and the travel of the handle 28 is automatically stopped.

At this point, the tension spring 50 which is disposed between the member 18 and the tubular part 25 will have been extended during the travel of the tubular part 25 along the member 18, whilst at the same time torsion will also have been imparted to said spring 50 by the rotation of the arm from its normal vertical position to its thread cutting position. On the handle 28 of the arm being released, the arm will return automatically to its normal vertical position and be returned back along the member 18 to its normal position by the spring 50.

An adjustable collar 41 is preferably mounted on the member 18 to set the initial position of the thread cutting tool 24 and with it the tubular part 25 mounted on the member 18.

I claim:

1. Improvements in screw-cutting lathes, comprising in combination, a screwed former, a traversing and pivotally mounted lever, a control member pivotally mounted in said lever to which a former engaging member is connected, a member pivotally mounted in said lever and interconnected with the control member which is connected with a thread cutting tool holder, and an abutment against which said control member is adapted to abut, so that on said control member being brought into engagement with the abutment and pressure exerted on said lever, the former engaging member is brought into engagement with the screwed former and the tool holder is brought into position for cutting a screw thread.

2. Improvements in screw-cutting lathes, comprising in combination, a screwed former, a traversing and pivotally mounted lever, a control member pivotally mounted in said lever to which a former engaging member is connected, a member pivotally mounted in said lever and interconnected with the control member which is connected with a thread cutting tool holder, an abutment against which said control member is adapted to abut, a gap in said abutment, so that on said control member being brought into engagement with the abutment and pressure exerted on said lever the former engaging member is brought into engagement with the screwed former and the tool holder is brought into position for cutting a screw thread, whilst when the control member reaches the gap in the abutment, pressure is released on same and the former engaging member automatically disengages the screwed former and the thread cutting tool the work.

3. Improvements in screw-cutting lathes, comprising in combination, a screwed former, a guide member, a lever pivotally mounted on said guide member, an extension on said lever on which a tool holder is mounted, a control member pivotally mounted in said lever to which a former engaging member is connected, and a pivotally mounted member in said lever interconnected with the control member for actuating the tool holder.

SYDNEY HERBERT VARNDELL.